United States Patent
Quirke et al.

(10) Patent No.: US 10,771,455 B2
(45) Date of Patent: Sep. 8, 2020

(54) SYSTEM AND METHOD FOR ENABLING SECURE AUTHENTICATION

(71) Applicant: Cryptomathic Ltd, Cambridge, Cambridgeshire (GB)

(72) Inventors: Dan Quirke, Cambridge (GB); Michael K. Bond, Cambridge (GB); Peter Landrock, Cambridge (GB)

(73) Assignee: Cryptomathic Ltd., Cambridge (GB)

( * ) Notice: Subject to any disclaimer, the term of this patent is extended or adjusted under 35 U.S.C. 154(b) by 99 days.

(21) Appl. No.: 15/533,636

(22) PCT Filed: Dec. 8, 2015

(86) PCT No.: PCT/GB2015/053750
§ 371 (c)(1),
(2) Date: Jun. 6, 2017

(87) PCT Pub. No.: WO2016/092286
PCT Pub. Date: Jun. 16, 2016

(65) Prior Publication Data
US 2017/0331819 A1    Nov. 16, 2017

(30) Foreign Application Priority Data
Dec. 8, 2014    (GB) .................................. 1421814.3

(51) Int. Cl.
*H04L 29/06*    (2006.01)
*G06F 21/43*    (2013.01)
(Continued)

(52) U.S. Cl.
CPC .......... *H04L 63/0838* (2013.01); *G06F 21/35* (2013.01); *G06F 21/43* (2013.01);
(Continued)

(58) Field of Classification Search
CPC . H04L 63/0838; H04L 63/067; H04L 9/3228; H04W 12/06; H04W 12/04;
(Continued)

(56) References Cited

U.S. PATENT DOCUMENTS 6,928,558 B1 * 8/2005 Allahwerdi ............. G06F 21/31
726/9
8,752,148 B1 * 6/2014 Vipond .................. H04L 9/3234
713/168
(Continued)

FOREIGN PATENT DOCUMENTS

KR    2009-0080415 A    7/2009
KR    2009-0080417 A    7/2009
(Continued)

OTHER PUBLICATIONS

Mulliner, C., et al., "SMS-Based One-Time Passwords: Attacks and Defense", Jul. 18, 2013, Correct System Design; [Lecture Notes in Computer Science; Lect. Notes Computer], Springer International Publishing, Cham, pp. 150-159.
(Continued)

*Primary Examiner* — Meng Li
(74) *Attorney, Agent, or Firm* — Knobbe, Martens, Olson & Bear, LLP (57) ABSTRACT

Broadly speaking, embodiments of the present invention provide systems and methods to provide a solution to the SIM swap attack problem for users that possess smartphones. In particular, the systems and methods require an online banking customer to authenticate a transaction using a combined one-time password (OTP) formed of a remotely generated OTP (generated remote to the smartphone) and a locally generated OTP (generated on the smartphone).

16 Claims, 5 Drawing Sheets

(51) Int. Cl.
*G06F 21/35* (2013.01)
*H04W 12/04* (2009.01)
*H04W 12/06* (2009.01)

(52) U.S. Cl.
CPC ........... *H04L 63/067* (2013.01); *H04W 12/04* (2013.01); *H04W 12/06* (2013.01)

(58) Field of Classification Search
CPC .......... H04W 12/0401; H04W 12/0608; G06F 21/35; G06F 21/43; G06F 21/40; G06F 21/34
See application file for complete search history.

(56) References Cited

U.S. PATENT DOCUMENTS

| | | | |
|---|---|---|---|
| 2007/0130472 A1* | 6/2007 | Buer | H04L 63/083 713/182 |
| 2010/0180328 A1* | 7/2010 | Moas | G06F 21/34 726/6 |
| 2012/0266224 A1* | 10/2012 | Gruschka | G06F 21/35 726/7 |
| 2013/0024918 A1 | 1/2013 | Cramer et al. | |
| 2013/0139222 A1* | 5/2013 | Kirillin | H04L 67/02 726/4 |
| 2013/0276078 A1 | 10/2013 | Rockwell | |
| 2014/0040628 A1 | 2/2014 | Fort et al. | |
| 2014/0081784 A1 | 3/2014 | Ahn | |

FOREIGN PATENT DOCUMENTS

| | | |
|---|---|---|
| KR | 2013-0027029 A | 3/2013 |
| KR | 2013-0027538 A | 3/2013 |

OTHER PUBLICATIONS

International Search Report and Written Opinion dated Feb. 15, 2016 in PCT Application No. PCT/GB2015/053750, 10 pgs.

Search Report dated Aug. 3, 2015 in Great Britain Application No. 1421814.3, 3 pgs.

Amended Search Report dated Nov. 25, 2015 in Great Britain Application No. 1421814.3, 10 pgs.

\* cited by examiner

SYSTEM AND METHOD FOR ENABLING SECURE AUTHENTICATION

CROSS-REFERENCE TO RELATED APPLICATIONS

This application is the U.S. National Phase under 35 U.S.C. § 371 of International Application No. PCT/GB2015/053750, filed Dec. 8, 2015, designating the United States, which claims priority to United Kingdom Application No. 1421814.3, filed Dec. 8, 2014.

FIELD OF THE INVENTION

The invention generally relates to a device, system and method for enabling secure authentication between a user and a third party using a one-time-passcode authentication mechanism.

BACKGROUND TO THE INVENTION

Some providers of personal banking services add strong authentication services to their Internet banking channel, such as multi-factor authentication services designed for e-banking applications, which provide a number of authentication features to prevent fraud during e-banking transactions. One common authentication mechanism is short message service-based (SMS-based) one-time-passcodes (OTPs). SMS-based OTPs were introduced to counter phishing and other attacks. SMS OTPs are often used as an additional factor in a multi-factor authentication system, where users are typically required to enter an OTP when logging-in to their online banking service. SMS OTPs are typically used for authenticating users as part of the registration and enrollment of new users, and as a step-up authentication mechanism as part of the workflow for adding a new payee.

Generally speaking, SMS OTPs authentication mechanisms require a link between bank account, the bank account owner and his mobile phone account. The owner of the bank account should be the only person who can receive the SMS OTPs sent to the phone number linked to his bank account. Thus, this link between an account, a user and a physical device (mobile phone) provides a strong multi-factor authentication mechanism.

However, SMS OTP is no longer considered secure, because SMS OTP relies on the security of mobile telephone communication networks. Some providers of personal banking services are experiencing significant levels of fraud from "SMS OTP SIM Swap" attacks.

Furthermore, conventional standalone OTP authentication mechanisms often require a user to switch between devices, or between windows or software applications on a device, in order to view a received OTP, which may not result in a user-friendly experience.

The present applicant has recognised the need for an improved method of providing SMS-based multi-factor authentication mechanisms, which are also more convenient for a user to use.

SUMMARY OF THE INVENTION

According to a first aspect of the invention, there is provided a mobile device for enabling secure authentication between a user and a third party using a one-time-passcode (OTP) authentication mechanism, the mobile device comprising:

a display for displaying information to the user;
a local one-time-passcode generating module which is configured to:
generate a local one-time passcode which is unique to the mobile device;
receive a third party one-time passcode which is unique to the third party; and
combine the local one-time passcode with the third party one-time-passcode to generate a combined one-time-passcode for authenticating the user to the third party
wherein the combined one-time-passcode is displayed to the user conveniently on the display.

Advantageously, the device provides a more user-friendly way of combining locally generated and received OTPs to provide a secure authentication (or secure communication) mechanism between a user and a third party. In embodiments, the device displays both the locally generated and received OTPs in a convenient manner for the user, for example, within the same application or within a single message (e.g. an SMS message). This enables the user to readily see both the OTPs without having to switch between apps on their mobile device (e.g. between one app which receives remotely generated OTPs and another app which generates local OTPs). Thus, the usability of the secure authentication mechanism is improved, while the complexity of the authentication process has increased.

A mobile device may be any computing device which is portable, e.g. a laptop, PC, tablet-PC, smartphone. The third party may be any party with whom the user wishes to communicate securely (and be authenticated by for such communications); a typical example is a bank.

It will be appreciated that the functionality of the local one-time-passcode generating module may be divided across several modules, e.g. a third party one-time passcode receiver for receiving the third party one-time passcode and/or a combined one-time-passcode generating module for generating the combined one-time-passcode. Alternatively, the functionality may be provided in a single module or a processor. The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

The local one-time-passcode generating module may be configured to generate the combined one-time-passcode by generating a message which contains both the local and third party one-time-passcodes which are displayed to the user. In other words, both the passcodes are displayed to the user without changing either passcode. Advantageously, as described above, both passcodes are displayed to the user in a single message or application so that the user experience and usability of the authentication mechanism is improved. Alternatively, the local one-time-passcode generating module may be configured to generate the combined one-time-passcode by cryptographically combining both the local and third party one-time-passcodes and displaying the cryptographically combined passcode to the user. Any known cryptographic techniques may be used, e.g. hashing.

The local one-time-passcode generating module may be configured to generate a local one-time passcode for each third party. For example, the mobile device may have an address book entry for each third party with which the user wishes to communicate (and be authenticated by) and the one-time passcode may be associated with the address book entry. In this scenario, the address book entry may comprise the one-time passcode.

The local one-time-passcode generating module may be configured to determine from which third party the third party one-time passcode was received and to select the local one-time passcode associated with the determined third party.

The mobile device may be configured to receive the third party one-time-passcode via any suitable mechanism, in particular via an SMS message. When the passcode is received by SMS, the local one-time-passcode generating module may be configured to extract the third party one-time-passcode from the received SMS message. Thereafter, the extracted third party one-time-passcode may be combined with the local one-time passcode in a cryptographically secure manner or may be combined simply by being displayed alongside the local one-time passcode. In some mobile device, it may not be possible to extract the third party one-time-passcode from the received SMS message. As an alternative, the local one-time-passcode generating module may be configured to: determine from which third party the SMS message was received; and select the local one-time passcode associated with the determined third party. The local one-time-passcode generating module may be configured to display the name of the third party with its associated one-time passcode together with the third party one-time passcode. For example, the name of the third party and its associated local one-time passcode may be displayed on the display alongside the SMS message with the third party one-time passcode. Displaying the local one-time passcode and third party one-time-passcode is therefore performed by the mobile device (i.e. the mobile device operating system) and not via the bank, which does not have access to the display of the mobile device.

The local one-time-passcode generating module may generate the local one-time passcode at regular intervals, e.g. weekly, daily, or even once per minute, as is commonly the case in time-based OTP generators.

The mobile device may be configured to receive the third party one-time passcode via a first channel, e.g. SMS. The mobile device may also be configured to transmit, via a second channel, the combined one-time-passcode to a remote authentication module to authenticate the user to the third party. The second channel is different and separate from the first channel as explained in more detail below.

The mobile device forms part of a secure system.

Thus, according to another aspect of the invention, there is provided a system for enabling secure authentication between a user and a third party using a one-time-passcode (OTP) authentication mechanism, the system comprising:
    an authentication module; and
    1 mobile device as described above.

The system may further comprise a third party one-time-passcode generation module for generating a third party one-time passcode which is unique to the third party. The authentication module and the third party one-time-passcode generation module may be the same or different modules.

The system preferably further comprises a first channel through which the third party one-time passcode is sent from the third party one-time-passcode generation module to the third party one-time-passcode receiver via and a second channel through which the combined one-time-passcode is sent to the authentication module. The second channel is different and separate from the first channel. The use of two channel (dual band) provides a secure solution because the local OTP generated by the mobile device mitigates against a SIM swap attack (as described in more detail below), while the OTP received in on the first channel (e.g. an SMS message) mitigates the risk of compromise from phone malware. The second channel may be the internet. The second channel may also be via the phone line, e.g. a user telephoning the third party and providing the combined one-time passcode (or part thereof) verbally. The second channel may be via a separate computing device into which the user inputs the whole or part of the passcode.

The authentication module may be configured to authenticate the combined one-time passcode by any known mechanism. For example, where the combined one-time passcode is generated by a cryptographically secure combination method, authentication may comprise decrypting the combined one-time passcode or regenerating the cryptographically secure combination. The authentication module may be configured to validate (or reject) the user depending on the outcome of the validation.

According to another aspect of the invention, there is provided a method of using a mobile device to enable secure authentication between a user and a third party using a one-time-passcode (OTP) authentication mechanism, the method comprising:
    generating, at the mobile device, a local one-time passcode which is unique to the mobile device;
    receiving, at the mobile device, a third party one-time passcode which is unique to the third party;
    combining, at the mobile device, the local one-time passcode with the third party one-time-passcode to generate a combined one-time-passcode for authenticating the user to the third party and
    displaying, at the mobile device, the combined one-time-passcode.

It will be appreciated that the above aspect can be combined with the features mentioned above in relation to the mobile device itself.

The invention further provides processor control code to implement the above-described systems and methods, for example on a general purpose computer system or on a digital signal processor (DSP). The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

BRIEF DESCRIPTION OF THE DRAWINGS

The invention is diagrammatically illustrated, by way of example, in the accompanying drawings, in which.

DETAILED DESCRIPTION

Broadly speaking, embodiments of the present invention provide systems and methods to provide a solution to the SIM swap attack problem for users that possess smartphones. In particular, the systems and methods require an online banking customer to authenticate a transaction using a combined OTP formed of a remotely generated OTP (generated remote to the smartphone, i.e. at a location separated physically or geographically from the smartphone) and a locally generated OTP (generated on the smartphone).

Consumers frequently use mobile devices as the primary channel for communicating with companies that provide them with services. For example, many customers will communicate with their banks almost entirely using their smartphone—using voice call, SMS or internet browsing. In this banking example, the bank would ideally have control of the software and hardware used for communication (or more particularly, the software and hardware used for secure authentication)—namely the smartphone—in order to resist attacks. However, this has previously been impossible since the phone software is the responsibility of the phone vendor, and third party applications are run in 'sandboxes', where they have limited access to communications data. Embodiments of the present application provide a method to enable a software application running on a smartphone to participate in the authentication of device communications, either by authenticating the customer to the bank, or by authenticating the bank to the customer, in a way that mitigates numerous methods of fraud.

The banking example is only one application of the method and is used below to illustrate the method and systems to implement such a method. Nevertheless, the method can be applied to other scenarios without loss of generality, since the methods can be applied to any scenario in which a third party communicates securely with customers that use smart devices, wherein such secure communication requires authentication prior to the communication.

OTP-Based Authentication

A typical banking application can be extended to include an additional customer authentication mechanism such as a one-time-password (OTP) generator. When making a transaction, the customer would enter the latest OTP from the application into a box on the website. However the usability of such an app can be a problem since the customer often uses their smart device as the web browser and would have to switch back and forth between website and app, while memorising the number. Furthermore, the app might become compromised by malware, undermining the value of the OTP for authentication.

Banks have another option which is to use an SMS message containing an OTP, sent to the customer's registered mobile upon requesting the transaction. This approach has the benefit that SMS communications are better protected by the operating system and are harder (or impossible) for malware to interfere with. SMS has been a preferential choice in the past because it works on mobile devices which are not smartphones (cannot run apps) and works even when the mobile device's internet connectivity is limited.

Figure 1:
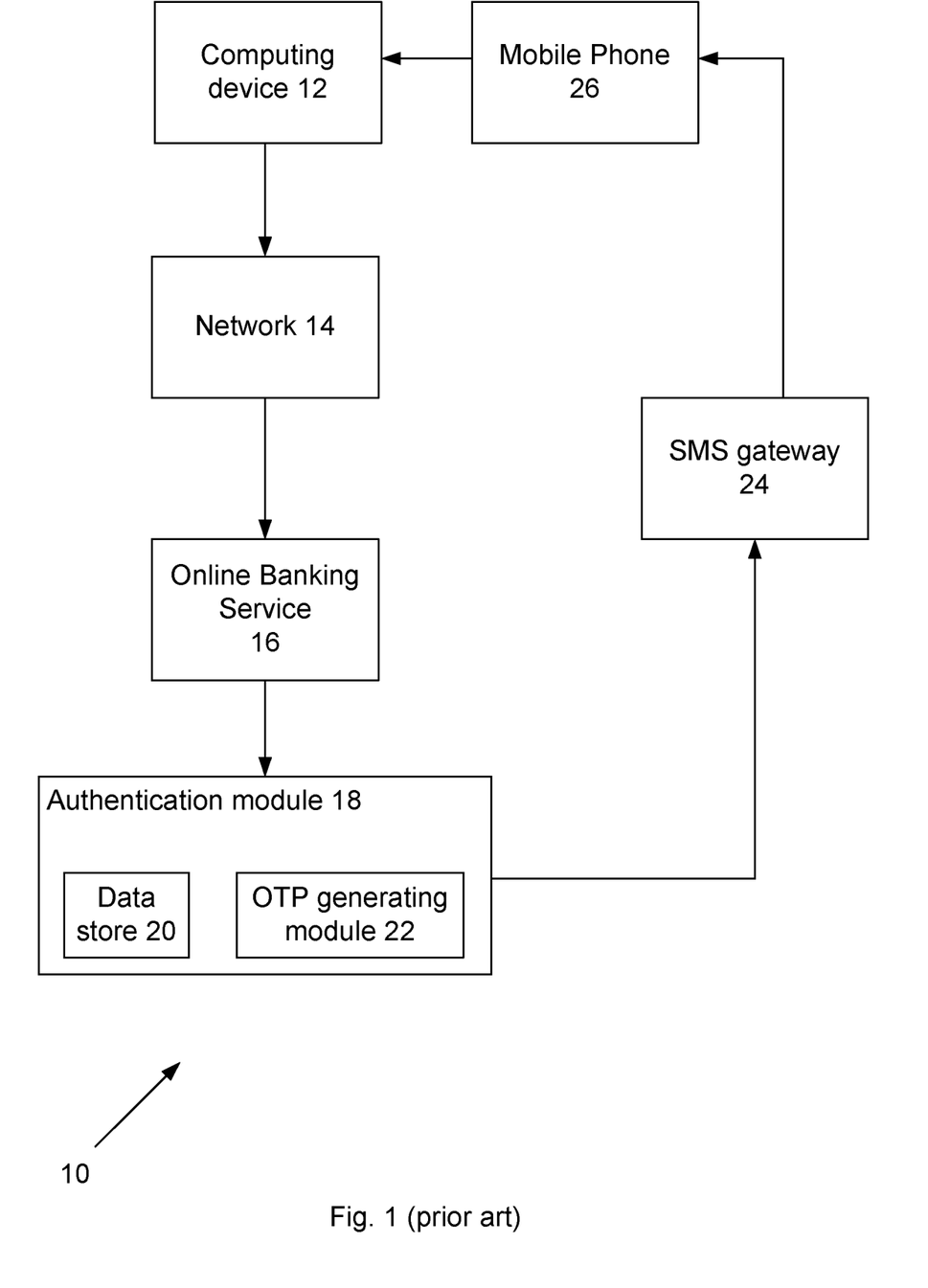
FIG. 1 shows a block diagram of a prior art SMS OTP authentication system.

FIG. 1 shows a block diagram of a prior art short message service one-time-passcode (SMS OTP) authentication system 10. A bank account owner who wishes to perform an online banking transaction, he typically uses a computing device 12 (e.g. a laptop, PC, tablet-PC, smartphone, etc.) to connect to his online banking service 16 via a network 14 (usually the internet). As mentioned above, SMS OTPs authentication services require the bank account owner to register his mobile device 26 (e.g. mobile phone—the two terms may be used interchangeably), or specifically, his mobile phone number with the service. The link is usually made between the bank account and the subscriber identification module (SIM) associated with the user's mobile device 26. The owner of the bank account should be the only person who can receive the SMS OTPs sent to the phone number linked to his bank account. The bank account owner's registered mobile phone number is stored in a data store 20, coupled to or part of the authentication module 18.

When the bank account owner attempts to perform an online banking transaction, the authentication module 18 extracts the mobile phone number associated with the owner from the data store 20. An OTP is generated by an OTP generating module 22, unique to the transaction the bank account owner is attempting to perform. The OTP generating module 22 is coupled to or part of the authentication module 18. The authentication module 18 sends the generated OTP to the mobile phone 26 in an SMS, via an SMS gateway 24. In some cases, the computing device 12 used to perform the online banking transaction is a mobile phone (i.e. a smartphone that is able to connect to the internet). In this case, the SMS is sent to the smartphone, and a separate mobile phone is not required. In other cases, the computing device 12 is a PC or laptop which cannot connect to a mobile phone network, and so the SMS is sent to the mobile phone 26 registered in the system.

On receipt of the SMS, the user sends the OTP contained within the SMS back to the authentication module for validation, but via the Internet banking channel (i.e. via network 14) rather than via SMS. Successful validation of the OTP by the authentication module 18 provides the assurance that the user (who is performing the online banking transaction) is in possession of their mobile phone 26 and so is likely a legitimate user.

SMS OTP is a useful authentication mechanism since the validation step uses an alternative out of band channel to the primary channel used for the online banking transaction (typically the Internet). The use of this secondary out of band channel almost completely mitigates the well-known 'man in the middle' attack which OTP schemes are often prone to by making it prohibitively expensive to effectively execute two attacks on two channels simultaneously.

SIM Swap Attack

The 'SIM swap' attack is a social engineering attack. In the SIM swap attack, a fraudster dupes the customer service department of a bank account owner's mobile phone service provider into shipping a replacement SIM card to him. The replacement SIM card is identical to the SIM card in the victim's mobile device. Once the fraudster is in possession of the SIM card, the SIM card can be used in any mobile phone to receive SMS OTPs. Thus a fraudster can initiate online banking transactions and verify them using the duplicate SIM card, such that the authentication module 18 believes the transaction is made by the legitimate bank account owner.

In particular online banking services, users of the service must authenticate themselves to the front end of the bank's Internet banking portal, using a membership number and a partial password. The membership number is static and not confidential. The use of the partial password entails the user providing n offsets of a shared secret. The partial password is confidential. The membership number and the partial password are authenticated by the bank, but not by the authentication module 18. Once authenticated, the user is able to view his account details online, and perform low risk administrative tasks. To set up a new payee, the highest risk operation available to the user, a step-up authentication using SMS OTP is often required, and this is where fraudsters are making their money.

The membership numbers, complete partial password secrets, and user mobile telephone numbers are easily phished using common phishing attacks. The fraudster simply buys these phished credentials on the open market and then contacts each phished bank account owner's mobile operator to order the replacement SIM cards. Once received, fraudsters have everything they need to perform the front end authentication to access online banking accounts, set-up a new payee to a mule account, receive and return an SMS OTP, and finally make a monetary transfer from the hacked bank account to the mule account.

The attack is hard for the bank account owner to detect since as soon as the fraudsters switch on the phone with the swapped SIM, the bank account owner's legitimate phone is kicked-off the mobile network. Even if the bank account owner happens to observe the loss of mobile network connectivity on his mobile phone, a loss of connectivity is not unusual, and so he is highly likely to ignore it. By the time he has notified their bank that his account has been compromised, the monetary transfer to the mule account has already taken place.

Dual Band OTP

Figure 2:
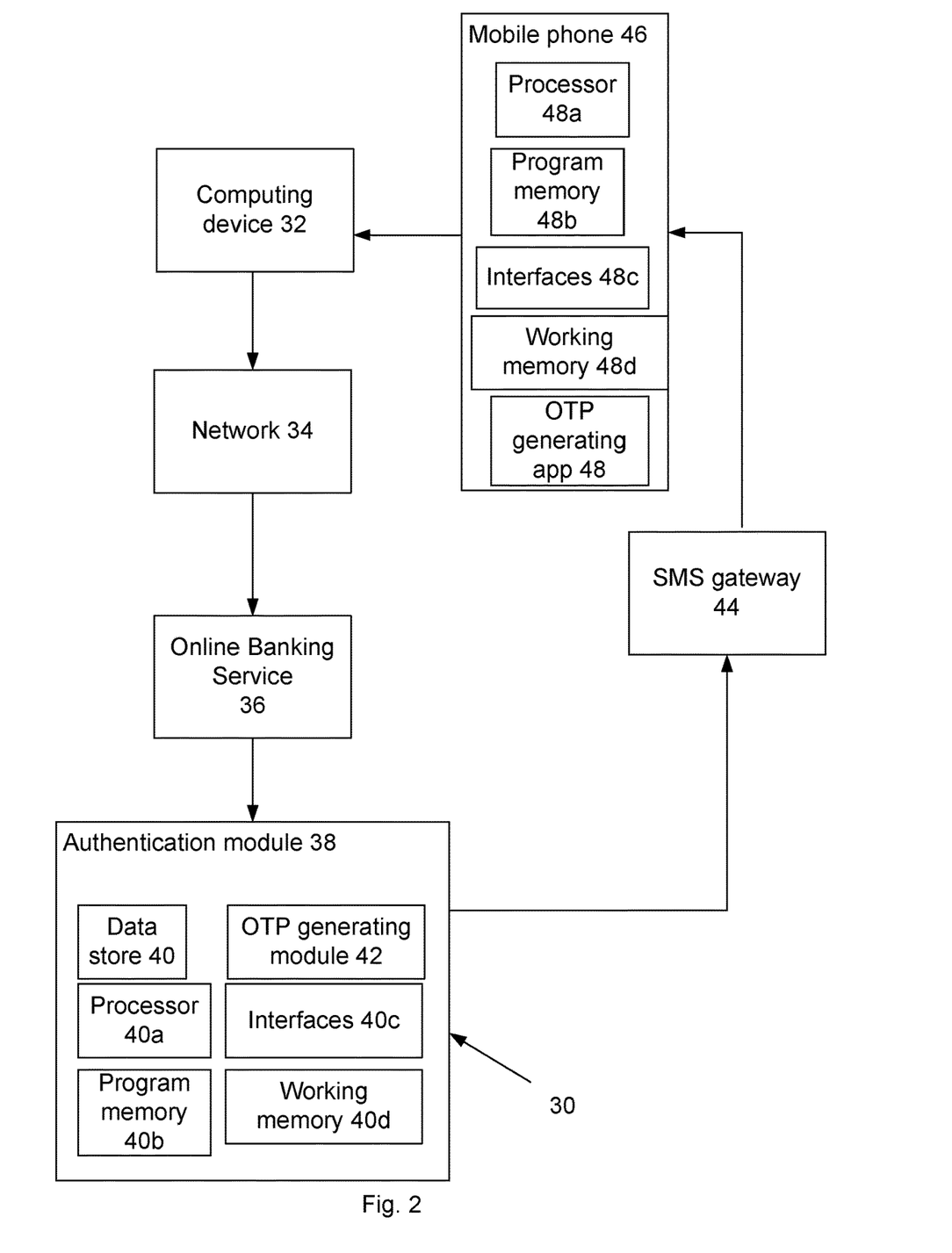
FIG. 2 shows a block diagram of a dual band OTP authentication system in an embodiment of the present invention.

Embodiments of the present application provide a solution to the SIM swap attack problem for users that possess smartphones, which the applicant calls "Dual Band OTP". FIG. 2 shows a block diagram of a dual band OTP authentication system 30.

An online banking customer performs an online banking transaction via his computing device 32 (e.g. a laptop, PC, tablet-PC, smartphone, etc.) which he uses to connect to his online banking service 36 via a network 34 (usually the internet). As above, the customer's registered mobile phone number is stored in a data store 40, coupled to or part of an authentication module 38. The authentication module 38 comprises a processor 40a coupled to program memory 40b storing computer program code to implement the method described below, to working memory 40d and to interfaces 40c such as a network interface. The authentication module may be implemented as a server. Similarly, the computing device will comprise a processor coupled to program memory, to working memory and to interfaces such as a screen, keyboard, mouse, touchscreen, and network interface.

When the customer attempts to perform an online banking transaction, the authentication module 38 extracts the mobile phone number associated with the customer from the data store 40. An OTP is generated by an OTP generating module 42, unique to the transaction the customer is attempting to perform. The OTP generating module 42 is coupled to or part of the authentication module 38. The authentication module 38 sends the generated OTP to the customer's mobile phone 46 in an SMS message, via an SMS gateway 44. The mobile device comprises a processor 48a coupled to program memory 48b storing computer program code to implement the method described below, to working memory 48d and to interfaces 48c such as a screen, touchscreen, and keypad.

For each device or module, the processor may be an ARM (RTM) device or may be a implemented in any known suitable hardware such as a microprocessor, a Digital Signal Processing (DSP) chip, an Application Specific Integrated Circuit (ASIC), Field Programmable Gate Arrays (FPGAs), etc. The processor may include one or more processing cores, with each core configured to perform independently. The at least one processor may have connectivity to a bus to execute instructions and process information stored in, for example, a memory. The program memory, in embodiments, stores processor control code to implement functions, including an operating system, various types of wireless and wired interface, storage and import and export from the device or module. The method can thus be a computer-implemented method which runs on at least one processor. For example, the processor of the authentication module (which may also be termed a server) may be used to generate the remote OTP in the OTP generating module 42. Similarly, the processor of the mobile phone may be used to generate the local OTP in the OPT generating app 48.

In some cases, the computing device 32 used to perform the online banking transaction is a mobile phone (i.e. a smartphone that is able to connect to the internet). In this case, the SMS is sent to the smartphone, and a separate mobile phone is not required. In other cases, the computing device 32 is a PC or laptop which cannot connect to a mobile phone network, and so the SMS is sent to the mobile phone 46 registered in the system.

Dual band OTP requires an online banking customer to authenticate themselves and an online banking transaction using OTPs from SMS messages sent to their registered phone number, and additionally, using OTPs generated on-the-fly by a software application (or 'app') 48 running on the customer's phone 46. Ordinarily, access to a customer's phone number and phone are exactly the same thing, but this assumption is undermined during a SIM swap attack.

The OTP generating app 48 is able to locally generate one-time-passcodes on the mobile phone 46 which are then combined in some way with the OTP received from the bank.

Some smartphone operating systems may prevent app 48 from being able to handle SMS messages directly. However, it is still an essential feature that an OTP which combines locally generated and received OTPs is generated without placing too high a burden on the user. Embodiments of the present application therefore provide a more user-friendly method of combining locally generated and received OTPs, which involves either automatically creating a combined OTP (without user involvement), or displaying both the locally-generated and received OTPs within the same application or within a single message (e.g. an SMS message) so that the user can readily see both OTPs without having to switch between apps on their mobile device.

Figure 3A:
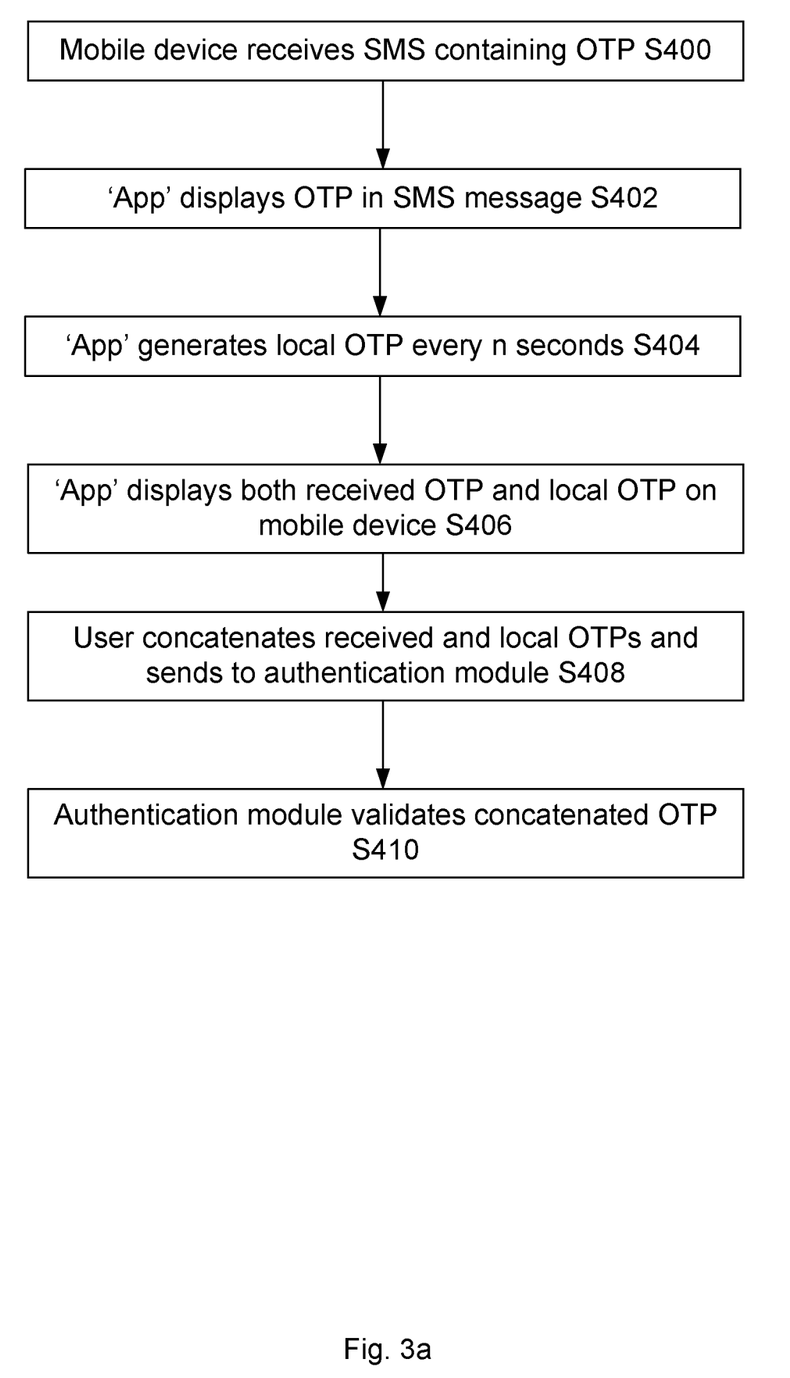
FIG. 3a shows a flow chart of example steps to authenticate a transaction using a concatenated OTP.
Figure 4:
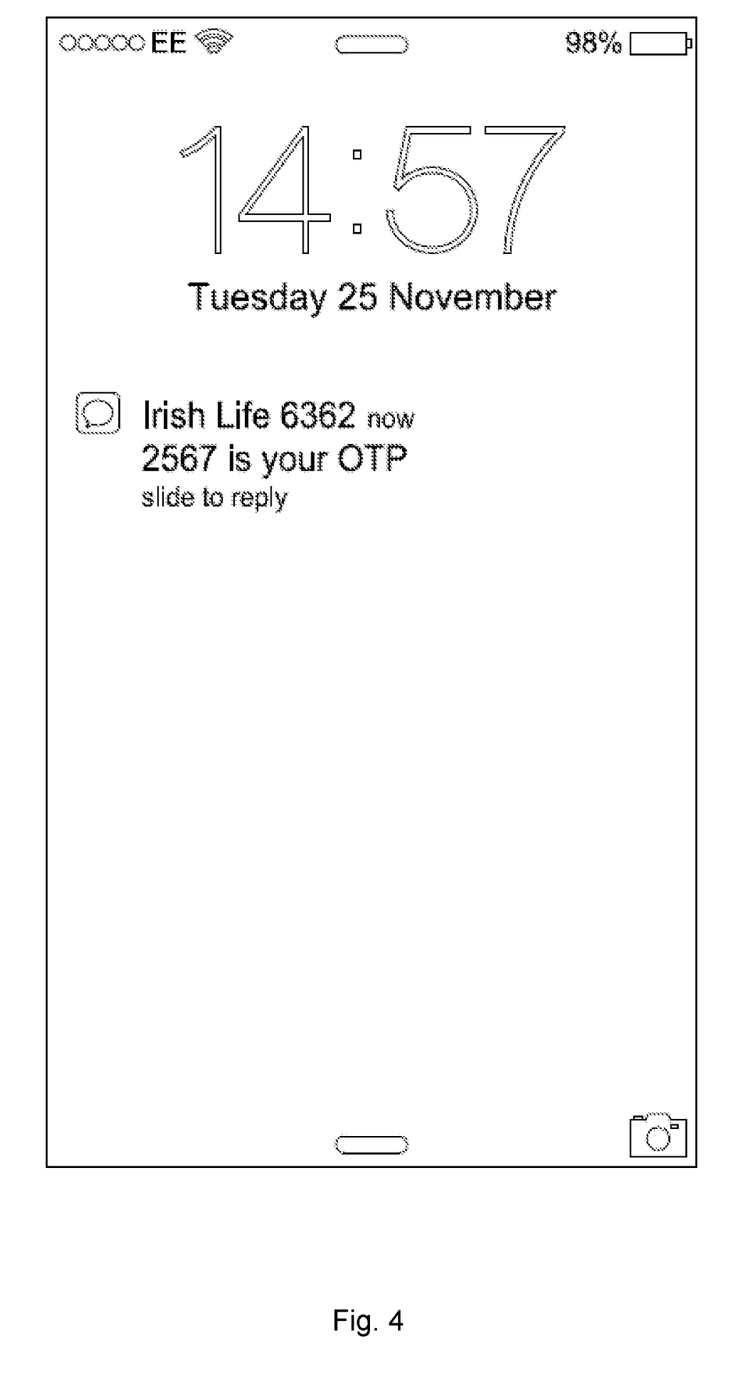
FIG. 4 shows an example view of a mobile device display displaying a locally generated OTP and a remotely generated OTP in a single message.

FIG. 3a shows the steps for achieving the combination OTP. The first step S400 is that the mobile device receives an SMS containing an OTP wherein the mobile device may be registered to receive such SMS OTPs from a bank. When the mobile phone 46 receives an SMS OTP from the bank it is displayed to the user (S402). FIG. 4 shows an example view of a mobile device display displaying a locally generated OTP and a remotely generated OTP in a single message. Here, the SMS OTP received from the bank is the second line in the message, i.e. "2567 is your OTP".

As previously described, embodiments of the present application provide a composite of SMS- and app-based authentication: the app is developed in order to create a data record in the customer's address book, under the phone number from which bank SMS messages are sent. The data record includes the name of the bank, which will be shown when SMS messages are received. This data record can be regularly updated by the app in the background, so that the bank name includes a regularly changing OTP. For instance, just as "John P. Smith" might be an address book entry, "MyBank Banking 3428" might be an address book entry, where 3428 is an OTP included in the name. The OTP in the address book data record could be updated weekly, daily, or even once per minute, as is commonly the case in time-based OTP generators. The data record updates are synchronised with updates happening in the bank's systems. Thus, the bank can determine if the combined OTP has been generated by the registered mobile device if the combined OTP it receives includes the correct locally generated OTP.

As shown at step S404, the app 48 may update the contact address book for the bank (or other similar third parties) with an OTP which changes every n seconds. Although the mobile device 46 is not able to extract and process the OTP received by SMS, the mobile device 46 is able to recognise the sender of the OTP. Once the sender is recognised, the mobile device displays the most recently generated local OTP for that sender with the OTP generated by app 48 (S406).

When the bank sends an SMS with an OTP authentication code, the name of the sender (as looked up in the address book) will appear next to the SMS message containing the OTP code. FIG. 4 shows an example implementation on a mobile device. In this example, both the locally generated OTP (top: "Irish Life 6363") and the remotely generated OTP (bottom) appear adjacent to one another in a single (SMS) message, such that it is straightforward for the customer to enter both together into their web browser to complete a transaction. Should the customer be browsing a bank website on their smart device, the SMS message containing both OTPs will usually appear in an overlay, with both OTPs visible, such that the user is not forced to switch back to a different software app (or even two apps) on their phone, as would be required when using an integrated OTP generator.

The user then sends a combined OTP which is simply a concatenation of both OTPs to the authentication module (S408). As in the previous arrangement, the user may type in the combined OTP into his computing device 32 so that the combined OTP is sent to the online banking portal via separate Internet banking channel 34. Also as before, the authentication module then verifies the combined OTP and validates (or rejects) the user depending on the outcome of the validation (S410).

Unlike solutions based on internet-driven SMS alternatives, such as "iOS push messages", embodiments of the present invention do not require internet connectivity on the mobile device to perform the authentication, because the locally generated OTP can be calculated by the app using simply a stored cryptographic key and a time source (which synchronises the local OTP generation with the OTP generation being performed by the bank). Unlike a conventional standalone OTP-generating app, the app described herein can advantageously alert the customer at the appropriate moment to the locally generated OTP, such as when an SMS OTP is received from the bank. Thus, the user experience is enhanced because the user does not need to take specific steps to generate a local OTP—the app can do this automatically upon receipt of a remotely generated OTP.

Dual band OTP is a secure solution because the OTP generated by the app 48 running on mobile phone 46 mitigates the SIM swap attack, while the OTP received in an SMS message mitigates the risk of compromise from phone malware.

In the above-described example, the method to combine local and remote OTPs is used to authenticate a customer to a bank in a way which is resistant to many common attacks. The method may also be used to conveniently authenticate a customer to a bank when the bank calls the customer. Since the name of the calling customer will appear on the smartphone screen as the bank rings in, the customer can simply be asked to enter or read out the OTP included in the name as part of the initial authentication for the bank. This information is readily to hand and the customer could not typically be asked to switch out to a different app and enter an OTP since this would be unusable: the customer might accidentally hit the wrong button and terminate the call, and might need to put the phone into speakerphone mode as they switch. Only more experienced smartphone users are comfortable with switching to other apps during calls.

The bank could alternatively use the OTP as a way to authenticate themselves to the customer when they call in, by offering to read out the OTP displayed by their name. It is straightforward to spoof the caller identity for incoming calls so being contacted by fraudsters with social engineering skills that purport to be from the bank is a considerable problem.

Clearly no single bank can choose to use the same OTP address book entry to authenticate both customer to bank and bank to customer—they must decide which approach is more important to them.

Figure 3B:
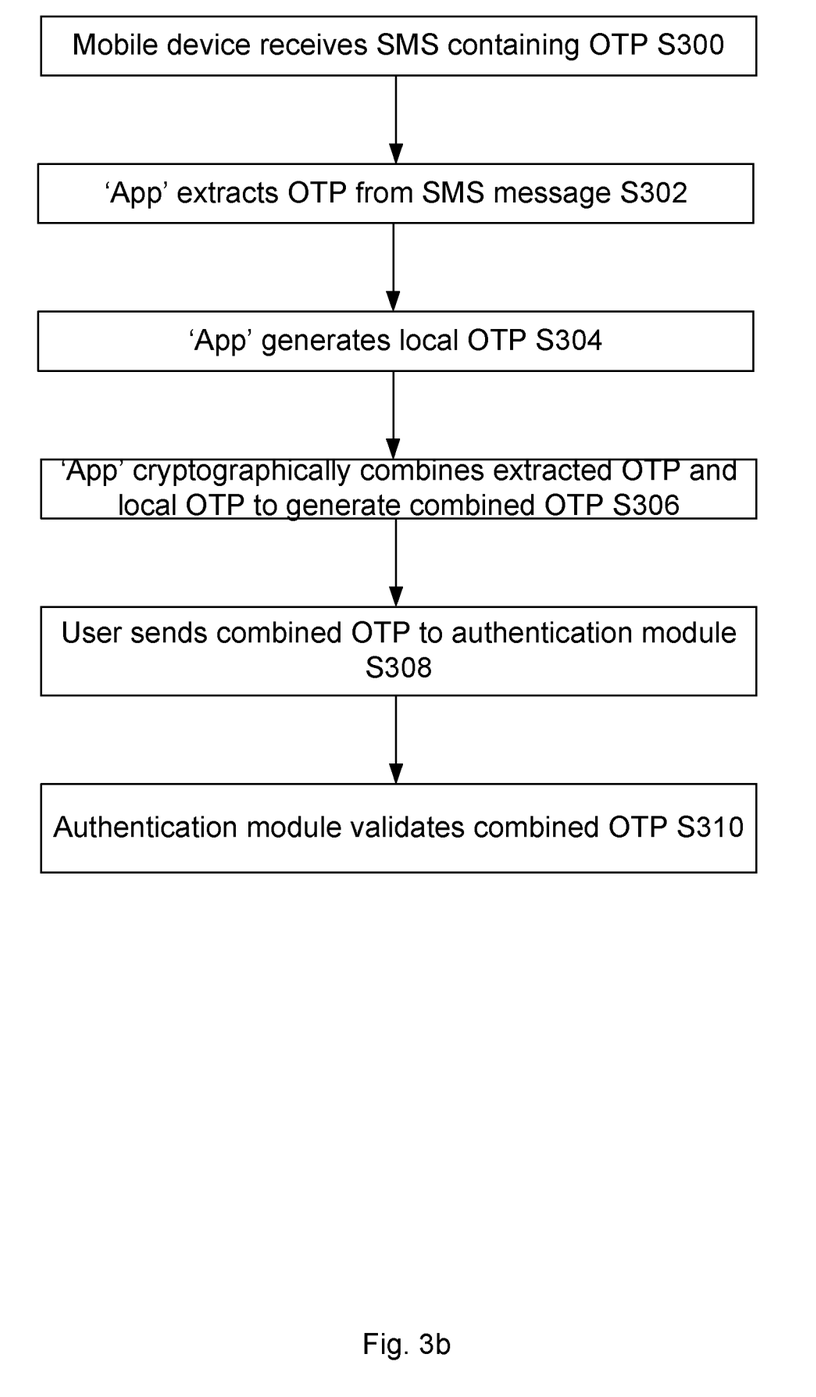
FIG. 3b shows a flow chart of example steps to authenticate a transaction using a combined OTP.

FIG. 3*b* shows another example of a method in which the two OTPs can be combined. In the first step S300, the mobile device receives an SMS containing the OTP. The OTP generating app 48 running on the mobile phone 46 is preferably registered to handle SMS messages received from the SMS gateway 44. Upon receipt, the app 48 can extract the received OTP from the SMS message as set out at Step S302. The SMS message received from the bank's authentication module 38 may be displayed on the mobile device but this is not essential in this arrangement. The next step S304 is for the app 48 to generate a local OTP (S304) which is then combined with the received, extracted OTP in a cryptographically secure manner (S306). One method to generate the local OTP is to use the method described above for FIG. 3*a*. That is, the mobile device creates a data record for the bank from which SMS messages are received, where the data record includes a regularly changing OTP (which is updated whenever the OTP is updated at the bank and is therefore, in sync with the bank). In this example, the app combines the local and remote OTPs instead of simply displaying them to the user. The app may be further configured to combine the two OTPs using the address book name space to request a customer to enter a set of characters from memorable information that they know. For example, the two OTPs may be combined with particular characters from the customer's memorable information (e.g. "MyBank $1^{st}$ and $3^{rd}$" where $1^{st}$ and $3^{rd}$ are the digits which they are to respond with), which the bank can use to verify that the combined OTP has originated from a registered device and a registered customer. This makes it difficult to phish or harvest more memorable information since attackers forging SMS messages or making voice calls would not be able to affect this name field.

The combined OTP must then be sent to the authentication module 38 for validation. One mechanism for achieving this is for the mobile device to display the resulting OTP to the customer who owns the mobile phone 46. Then at step S308, the customer sends the resulting OTP using his computing device 32 back to the authentication module 38 for validation. The customer may key in the combined OTP. It is important to note that the combined OTP is sent back to the authentication module via a different channel, e.g. the Internet banking channel (i.e. via network 34) rather than via SMS. The authentication module 38 may validate the received OTP (S301) for example by decrypting the OTP and/or extracting the requested memorable information characters from the combined OTP and comparing them against the memorable information known by the bank. If the memorable information matches, this confirms that the combined OTP originated from the customer). Successful validation of the OTP by the authentication module 38 provides the assurance that the user (who is performing the online banking transaction) is in possession of their mobile phone 46, and so is likely a legitimate user.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A mobile device for enabling secure authentication between a user and a third party using a one-time-passcode (OTP) authentication mechanism, the mobile device comprising:
    a mobile device screen for displaying information to the user; and
    first circuitry configured to implement a local one-time-passcode generating module which is configured to:
        generate at regular intervals a local one-time-passcode which is unique to the mobile device and is valid for use in a single authentication, wherein the local one-time-passcode is a regularly changing local one-time-passcode;
        receive, from second circuitry configured to implement a remote authentication module, a third party one-time-passcode which is unique to the third party via a short message service (SMS) message sent from the remote authentication module; and
        combine the regularly changing locally generated local one-time-passcode with the received third party one-time-passcode to generate a combined one-time-passcode for authenticating the user to the third party,
    wherein the combined one-time-passcode is displayed to the user on the mobile device screen.

2. A mobile device according to claim 1, wherein the local one-time-passcode generating module is configured to generate the combined one-time-passcode by generating a message which contains both the local and third party one-time-passcodes which are displayed to the user.

3. A mobile device according to claim 1, wherein the local one-time-passcode generating module is configured to generate the combined one-time-passcode by cryptographically combining both the local and third party one-time-passcodes and displaying the cryptographically combined one-time-passcode to the user.

4. A mobile device according to claim 1, wherein the local one-time-passcode generating module is configured to generate a local one-time-passcode for each third party of a plurality of third parties comprising the third party.

5. A mobile device according to claim 4, wherein the local one-time-passcode generating module is configured to determine from which third party the third party one-time-passcode was received and to select the local one-time-passcode associated with the determined third party.

6. A mobile device according to claim 1, wherein the local one-time-passcode generating module is configured to:
    extract the third party one-time-passcode from the received SMS message; and
    combine the extracted third party one-time-passcode with the local one- time-passcode in a cryptographically secure manner.

7. A mobile device according to claim 1, wherein the local one-time-passcode generating module is configured to generate a local one-time-passcode for each third party and wherein the local one-time-passcode generating module is configured to:
    determine from which third party the SMS message was received; and
    select the local one-time-passcode associated with the determined third party.

8. A mobile device according to claim 7, wherein the local one-time-passcode generating module is configured to display the name of the determined third party with the local one-time-passcode associated with the determined third party together with the third party one-time-passcode.

9. A mobile device according to claim 1, which is configured to receive the third party one-time-passcode via a first channel and wherein the mobile device is further configured to transmit, via a second channel, the combined one-time-passcode to the remote authentication module to authenticate the user to the third party.

10. A mobile device according to claim 1, wherein the local one-time-passcode generating module is configured to generate the local one-time-passcode using a time source.

11. A system for enabling secure authentication between a user and a third party using a one-time-passcode (OTP) authentication mechanism, the system comprising:
    first circuitry configured to implement remote authentication module; and
    a mobile device comprising:
        a mobile device screen for displaying information to the user; and
        second circuitry configured to implement a local one-time-passcode generating module which is configured to:
            generate at regular intervals a local one-time-passcode which is unique to the mobile device and is valid for use in a single transaction, wherein the local one-time-passcode is a regularly changing local one-time-passcode;
            receive, from the remote authentication module, a third party one-time-passcode which is unique to the received third party via a short message service (SMS) message sent from the remote authentication module; and
            combine the regularly changing locally generated local one-time-passcode with the received third party one-time-passcode to generate a combined one-time-passcode for authenticating the user to the third party, wherein the combined one-time-passcode is displayed to the user on the mobile device screen.

12. The system of claim 11, further comprising third circuitry configured to implement a third party one-time-passcode generation module for generating a third party one-time-passcode which is unique to the third party.

13. The system of claim 12, further comprising a first channel through which the third party one-time-passcode is sent from the third party one-time-passcode generation module to the mobile device and a second channel through which the combined one-time-passcode is sent to the authentication module.

14. The system of claim 11, wherein the local one-time-passcode generating module is configured to generate the local one-time-passcode using a time source.

15. A method of using a mobile device to enable secure authentication between a user and a third party using a one-time-passcode (OTP) authentication mechanism, the method comprising:
- generating at regular intervals, at the mobile device, a local one-time-passcode which is unique to the mobile device, wherein the local one-time-passcode is regularly changing local one-time-passcode;
- receive, at the mobile device, a third party one-time-passcode from circuitry implementing a remote authentication module, the third party one-time-passcode received via a short message service (SMS) message sent from the remote authentication module, wherein the third party one-time-passcode is unique to the third party;
- combining, at the mobile device, the regularly changing locally generated local one-time-passcode with the received third party one-time-passcode to generate a combined one-time-passcode for authenticating the user to the third party; and
- displaying, at the mobile device, the combined one-time-passcode.

16. A non-transitory computer-readable medium for enabling secure authentication between a user and a third party using a one-time-passcode (OTP) authentication mechanism, the non-transitory computer-readable medium storing instructions that, when executed by a hardware processor, cause the hardware processor to perform the method of:
- generating at regular intervals, at the hardware processor, a local one-time-passcode which is unique to the hardware processor, wherein the local one-time passcode is a regularly changing local one-time-passcode;
- receive, at the hardware processor, a third party one-time-passcode from circuitry implementing a remote authentication module, the third party one-time-passcode received via a short message service (SMS) message sent from the remote authentication module, wherein the third party one-time-passcode is unique to the third party;
- combining, at the hardware processor, the regularly changing locally generated local one-time-passcode with the received third party one-time-passcode to generate a combined one-time-passcode for authenticating the user to the third party; and
- displaying the combined one-time-passcode.

* * * * *